United States Patent [19]
Ishida et al.

[11] Patent Number: 6,114,786
[45] Date of Patent: Sep. 5, 2000

[54] ROTOR FOR VEHICULAR ALTERNATING CURRENT GENERATOR

[75] Inventors: Hiroshi Ishida, Anjo; Tooru Ooiwa, Toyota, both of Japan

[73] Assignee: Denso Corporation, Kariya, Japan

[21] Appl. No.: 09/337,468

[22] Filed: Jun. 21, 1999

[30] Foreign Application Priority Data

Oct. 12, 1998 [JP] Japan .................................. 10-289770

[51] Int. Cl.$^7$ ..................................................... H02K 3/32
[52] U.S. Cl. ............................................. 310/71; 310/194
[58] Field of Search ................................. 310/194, 67 R, 310/71, 261, 264, 263; 29/596–598

[56] References Cited

U.S. PATENT DOCUMENTS

| | | | |
|---|---|---|---|
| 3,603,825 | 9/1971 | Sheridan et al. | 310/194 |
| 4,347,493 | 8/1982 | Adams et al. | 336/192 |
| 4,731,555 | 3/1988 | Torimoto et al. | 310/71 |
| 5,361,011 | 11/1994 | York | 310/194 |
| 5,539,265 | 7/1996 | Harris et al. | 310/263 |
| 5,808,381 | 9/1998 | Aoyama et al. | 310/12 |
| 5,898,252 | 4/1999 | Tanaka et al. | 310/214 |

FOREIGN PATENT DOCUMENTS

| | | |
|---|---|---|
| 62-138041 | 6/1987 | Japan . |
| 5-34896 | 5/1993 | Japan . |
| 8-331786 | 12/1996 | Japan . |

*Primary Examiner*—Nestor Ramirez
*Assistant Examiner*—Tran N Nguyen
*Attorney, Agent, or Firm*—Pillsbury Madison & Sutro Intellectual Property Group LLP

[57] ABSTRACT

A flanged part of an insulating bobbin is formed with a first hook part for directing a lead wire of a field coil in a radially inward direction along an end surface of the flanged part, and a second hook part for directing the radially inwardly directed field coil in an axial direction. The lead wire of the field coil is arranged to extend in the radial direction from a coil-winding part of the field coil through the first hook part, and to extend in the axial direction through the second hook part.

14 Claims, 4 Drawing Sheets

ROTOR FOR VEHICULAR ALTERNATING CURRENT GENERATOR

CROSS REFERENCE TO RELATED APPLICATION

This application relates to and incorporates herein by reference Japanese Patent Application No. 10-289770 filed on Oct. 12, 1998.

BACKGROUND OF THE INVENTION

1. Field of the Invention

The present invention relates to a rotor for a vehicular alternating current generator which is mounted on passenger cars, trucks and the like.

2. Related Art

In a conventional vehicular alternating current generator (alternator) disclosed in JP-B2-5-34896, a field coil is wound around an insulating bobbin. The insulating bobbin has a coil-winding body part around which the field coil is wound and flanged parts extending in a radially outward direction from both ends of the coil-winding body part. A radial protrusion part and an axial protrusion part are provided on the flanged part so that a lead wire at a coil-winding start side and a lead wire at a coil-winding end side of the field coil are wound thereon respectively to restrict slackening of the field coil.

Further, in JP-A-8-331786, it is disclosed to provide a cut-out part on a protrusion part provided radially outside a flanged part, so that a field coil is press-inserted to improve rotor production work efficiency.

According to the above conventional constructions, the lead wires at the coil-winding start side and coil-winding end side of the field coil which are to be fixed to the insulating bobbin are located further outside of the radially outermost periphery of the field coil. Therefore, those parts are likely to be subjected to a centrifugal force generated during rotation of the rotor.

Particularly, in the former conventional construction, the lead wires of the field coil at the coil-winding start side and the coil-winding end side are wound around the radial protrusion part provided on the flanged part of the insulating bobbin. Thus, as a large centrifugal force is applied to the root part of the radial protrusion part during rotation, the root part is likely to fracture causing breakage of the field coil.

In the latter conventional construction, as the lead wire is inserted from the outside into the groove opening outwardly in the radial direction, the holding force against the centrifugal direction is small. If the tightening is set to withstand the centrifugal force, the intended improvement in the rotor production efficiency can not be attained.

Further, in both of the above conventional constructions, the protrusion part extending outwardly in the radial direction from the flanged part is designed to hold the field coil. This results in difficulty of sizing the rotor compact. Thus, an air flow passage in the axial direction for air-cooling the field coil is closed, and the flow resistance is increased. Further, cooling the field coil by the air flow is lessened, the output performance is lowered, and the insulating film on the field coil is deteriorated by the temperature rise in the field coil.

SUMMARY OF THE INVENTION

It is an object of the present invention to provide a rotor for a vehicular alternating current generator, which has high durability even under conditions in which a field coil is subjected to a centrifugal force.

Further, it is another object of the present invention to provide a rotor for a vehicular alternating current generator which has reduced air flow resistance in an axial air flow passage for cooling a field coil.

According to the present invention, a flanged part of an insulating bobbin is formed with a first hook part which directs a lead wire of a field coil in a radially inward direction along an end surface of the flanged part and with a second hook part which directs the field coil further in an axial direction. The lead wire is arranged in a radial direction from a coil-winding part through the first hook part and further in the axial direction through the second hook part. As the first hook part is required only to direct the lead wire in the radially inward direction, a large protrusion is not necessitated. Thus, slackening of the field coil can be prevented in a simple construction without closing a cooling air wind passage.

For not closing the cooling air wind passage, the lead wire may be arranged to extend through a radially outermost end of the flanged part and to be directed in a radially inward direction along an axial end surface of the flanged part. By thus arranging the lead wire though the radially outermost end of the flanged part, the air flow resistance of the axial air flow passage for cooling the field coil can be reduced.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Embodiments of a rotor for a vehicular alternating current generator to which the present invention is applied is described hereunder with reference to the drawings.

First Embodiment

Figure 1:
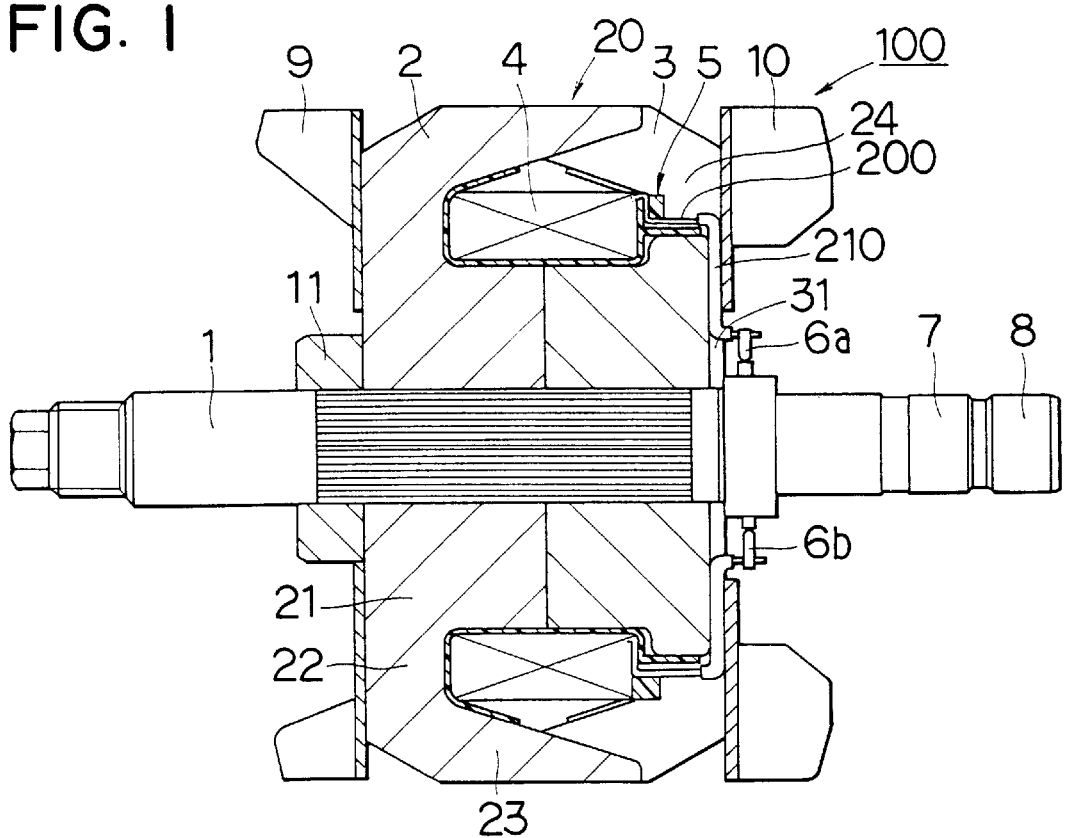
FIG. 1 is a cross sectional view showing a rotor for a vehicular alternating current generator according to a first embodiment of the present invention.

Referring first to FIG. 1, a rotor 100 for a vehicular alternating current generator (alternator) is supported rotatably by cylindrical frames (not shown) and driven by an engine (not shown) mounted in a vehicle.

The rotor 100 has a rotary shaft 1 and a Lundell type field magnetic core 20 press-fitted around the rotary shaft 1. The field magnetic core 20 is constructed by a pair of claw poles 2 and 3 opposed to each other. The claw poles 2 and 3 have a boss part 21 arranged coaxially with the rotary shaft 1, radial parts 22 extending from both axial ends of the boss part 21 in the radial direction, and nail-shaped magnetic pole parts 23 extending in the axial direction from the top ends of the radial parts 22. A V-shaped groove 24 is formed between two adjacent radial parts 22. The pair of claw poles 2 and 3 are assembled with the plurality of nail-shaped magnetic pole parts 23 being intermeshed with each other alternately. The field magnetic core 20 may be in a three-divided construction, which comprises the boss part 21 and end parts arranged both of its axial ends.

Cooling fans 9 and 10 are fixed to both ends of the field magnetic core 20, respectively, to supply cooling air wind for cooling the vehicular alternating current generator when the rotor 100 rotates. A spacer 11 is fixed to the field magnetic core 20.

Figure 2:
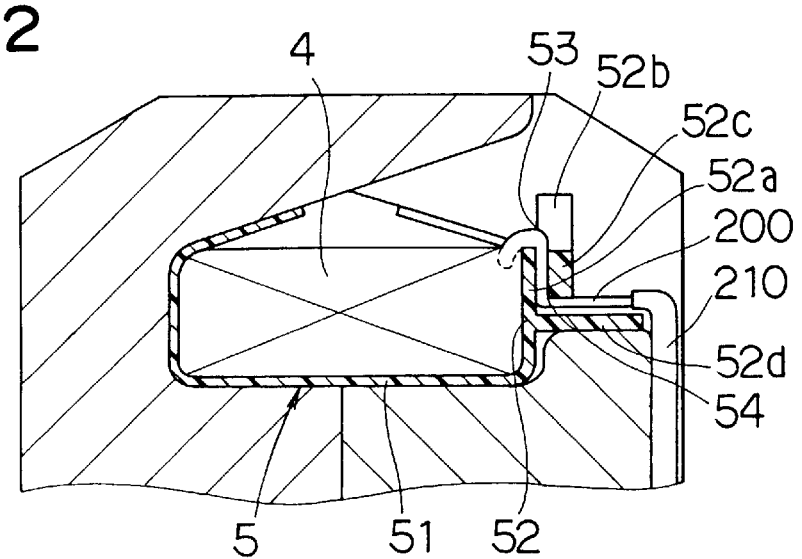
FIG. 2 is an enlarged cross sectional view showing a part of the rotor shown in FIG. 1.

A field coil 4 is wound around an insulating bobbin 5 made of resin and is accommodated within a space surrounded by the boss part 21, radial parts 22 and the nail-shaped magnetic pole parts 23 of the field magnetic core 20. The insulating bobbin 5 has, as shown in FIG. 2, a coil-winding body part 51 arranged around an outer periphery of the boss part 21 and flanged parts 52 arranged at both sides of the coil-winding boss part 51. The flanged part 52 has a petal-shaped part arranged along the inside surface of the nail-shaped magnetic pole part 23 and a coil hook part described below, both being formed integrally.

Electric lead wires 200 at the coil-winding start side and the coil-winding end side of the field coil 4 extend out of the coil hook part, respectively, and are arranged to extend along the surface of the field magnetic core 20. In this embodiment, as shown in FIG. 1, the lead wires 200 at the coil-winding start side and the coil-winding end side of the field coil 4 extend from axially symmetric positions with respect to the rotary shaft 1, and are in the same arrangement shape.

In this embodiment, the lead wire 200 is arranged to extend first in the radial direction from the field coil 4 through the axial side surface of the flanged part 52 of the insulating bobbin 5, and to extend next in the axial direction along the bottom surface of a groove 24 of the field magnetic core 20. It is arranged to extend further in the radial direction through a passage formed between the end surface of the field magnetic core 20 and a cooling fan 10. Here, the passage is provided by a groove 31 formed on the axial end surface of the field magnetic core 20.

Two slip rings 7 and 8 are provided on one axial end side of the rotary shaft 1. Those slip rings 7 and 8 are connected to connecting terminals 6a and 6b, respectively. Terminal ends of the lead wires 200 arranged along the surface of the field magnetic core 20 are connected to the connecting terminals 6a and 6b, respectively.

Figure 3:
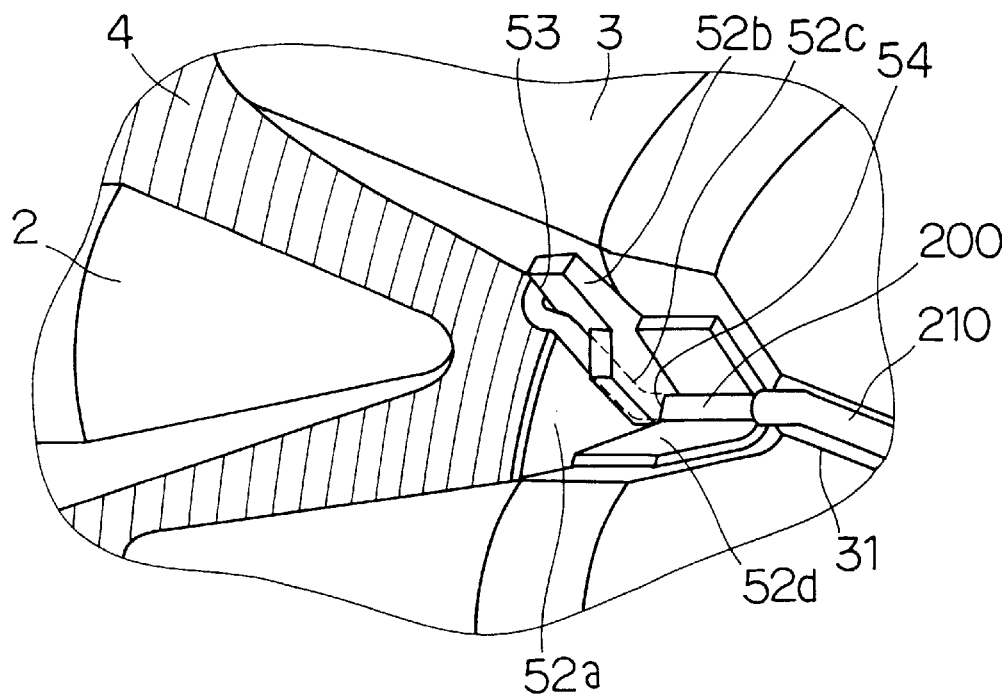
FIG. 3 is a perspective view showing a major part of the rotor shown in FIG. 1.

As shown in FIGS. 2 and 3, the flanged part 52 extending from the end of the coil-winding body part 51 of the insulating bobbin 5 in the radially outward direction has a first hook part 53 protruding in the radially outward direction and a second hook part 54 protruding in the circumferential direction to provide a space through which the field coil 4 is directed in the radially inward direction.

The flanged part 52 has a shape shown in FIG. 3 at the coil hook part. The flanged part 52 has a fan-shaped plate part 52a, a pillar part 52b, an eaves part 52c and a V-shaped part 52d. The pillar part 52b and the V-shaped part 52d are positioned in a space between two circumferentially adjacent radial parts 22 of the field magnetic core 20.

The pillar part 52b is formed to extend in a manner attached to the axial end surface of the plate part 52a. Further, the pillar part 52b is formed to have its top end part at a more radially outer position than the outer circumferential periphery of the plate part 52a. The first hook part 53 is provided by the angled corner part at the top end of the pillar part 52b.

The eaves part 52c is formed on the side surface of the pillar part 52b to extend in parallel with the plate part 52a. This eaves part 52c is spaced from the plate part 52a so that the lead wire 200 of the field coil 4 may be accommodated in the space. The eaves part 52c is positioned to extend from one side end of the V-shaped part 52d and to spaced from the other side end of the same. Further, a space is formed between the edge at the radially inner side of the eaves part 52c and the bottom surface of the V-shaped part 52d to accommodate the lead wire 200 of the field coil 4. The second hook part 54 is provided by the edge at the radially innermost side of the eaves part 52c.

The coil-winding end side of the field coil 4 wound around the coil-winding body part 51 of the insulating bobbin 5 is hooked on the first hook part 53, and extends in the radially inward direction along the axial end surface of the flanged part 52. The coil-winding end side of the field coil 4 is hooked further with the second hook part 54 at the more radially inner position than the outer periphery of the field coil 4 and extends in the axial direction.

In the coil hook part formed on the flanged part 52 of the insulating bobbin 5, the lead wire 200 of the field coil 4 is arranged as shown in FIG. 3. The first hook part 53 is located behind the coil-winding direction of the field coil 4. The lead wire 200 is hooked with the first hook part 53 from the outer periphery of the coil-winding part of the field coil 4, bent in the axially inward direction, and taken out to the side of the end surface of the plate part 52a. The lead wire 200 is hooked with the outer peripheral edge of the plate part 52a at generally the same position, bent in the radially inward direction, and arranged in the radial direction along the axial end surface of the plate part 52a. The lead wire 200 is then inserted into the space between the eaves part 52c and the plate part 52a, and arranged to extend though this space. The lead wire 200 is hooked with the second hook part 54 formed at the radially innermost side edge of the eaves part 52c, bent in the axial direction, and arranged to extend in the axial direction along the bottom surface of the V-shaped part 52d.

Figure 4:
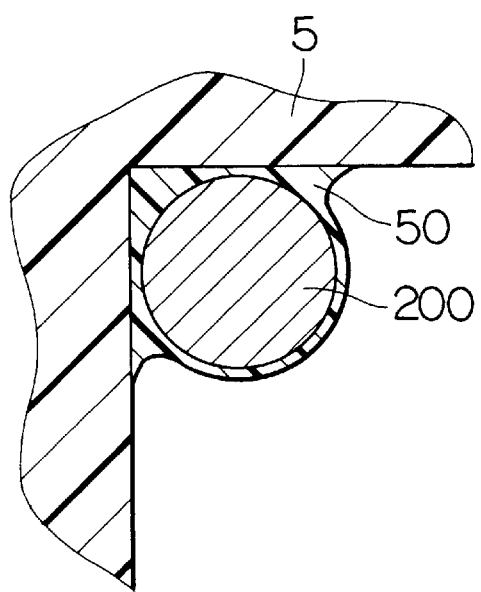
FIG. 4 is a cross sectional view showing a cross section of a lead wire and an insulating bobbin in the first embodiment.

Further, the lead wire 200 is inserted into an insulation protecting tube 210, and arranged along the field magnetic core 20. An impregnated material 50 made of resin is pasted along the lead wire 200 arranged to extend through the above paths as shown in FIG. 4, so that the lead wire 200 is bonded to the insulating bobbin 5.

In this embodiment, the lead wire 200 of the field coil 4 is arranged along the insulating bobbin 5. The lead wire 200 extended from the outer peripheral surface of the field coil 4 along the field magnetic core 20 in staircase manner is only bent in a simple crank shape without being wound around, and reaches the connecting terminal 6a. Thus, the lead wire 200 of the field coil 4 can be extended by only bending into a simple shape.

The second hook part 54 is located at the radially inner side of the radially outer periphery of the field coil 4. Thus, the lead wire 200 taken out from the outer peripheral surface of the field coil 4 can be fixed for ensuring sufficient strength against the centrifugal force.

The lead wire 200 is arranged along a recess-shaped corner formed by a plurality of members 52*a*, 52*b*, 52*c* and 52*d* formed on the flanged part 52. Thus, the lead wire 200 and the insulating bobbin 5 are bonded to each other over a wide area by the impregnated material 50. In particular, the entirety of the lead wire 200 is fixed firmly, because the lead wire 200 is arranged to extend in the radial direction along the plate part 52*a* of the insulating bobbin 5 and is arranged in the axial direction along the bottom surface of the V-shaped part 52*d*, and the impregnated material 50 is pasted over the entirety of the lead wire 200.

The insulating bobbin 5 is constructed to have members 52*b* and 52*c* as the axial protrusion part protruding from the flanged part 52 in the axial direction. Thus, the centrifugal force applied to those members can be suppressed.

Here, a slit is provided in the plate part 52*a* to extend in the radial direction, so that lead wire at the coil-winding start side may be taken out from the surface of the coil-winding body part 51.

According to the above construction, the lead wire 200 extended from the field coil 4 can be arranged compactly so that a sufficient strength against the centrifugal force can be ensured.

Second Embodiment

The second embodiment is differentiated from the first embodiment in that the axial protrusion part protruding in the axial direction from the flanged part 52 is shaped differently.

Figure 5:
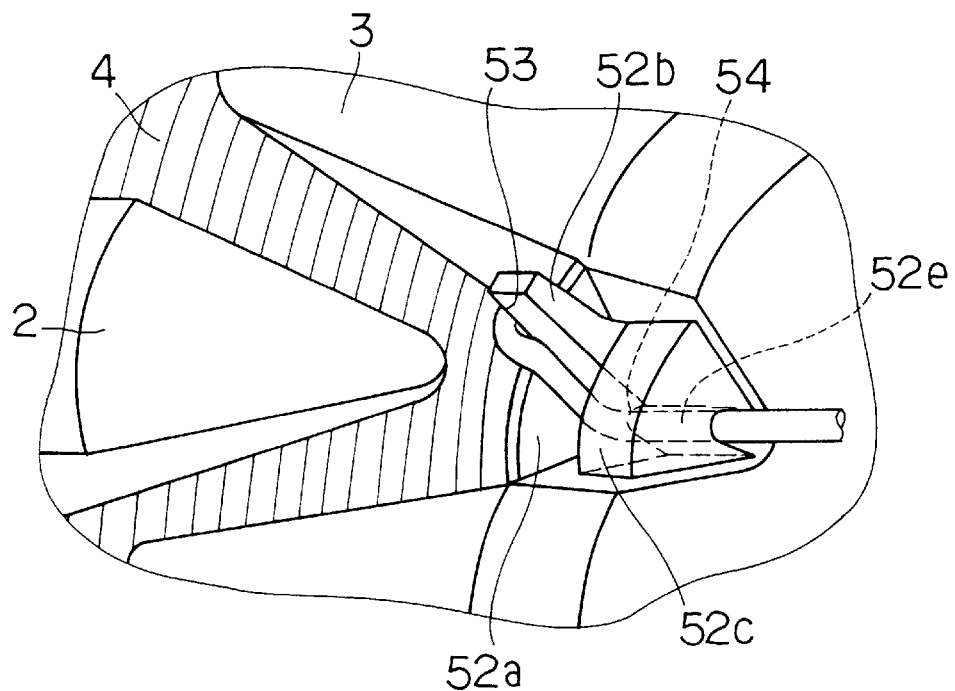
FIG. 5 is a perspective view showing a rotor for a vehicular alternating current generator according to a second embodiment of the present invention.

As shown in FIG. 5, the axial protrusion part has the fan-shaped plate part 52*a*, pillar part 52*b*, eaves part 52*c* and groove part 52*e*.

The pillar part 52*b* is formed to protrude in such a manner that it is attached to the axial end surface of the plate part 52*a*. The first hook part 53 is provided by the angled part of the top end part which protrudes in the radially outward direction more than the outer peripheral edge of the plate part 52*a* of the pillar part 52*b*.

The eaves part 52*c* has generally a fan shape which is along the space formed between the adjacent nail-shaped magnetic pole parts 23, and is integrally formed with the pillar part 52*b* on the axial end surface of the pillar part 52*b*. A space is provided between the eaves part 52*c* and the plate part 52*a* to accommodate the lead wire 200 of the field coil 4. A groove part 52*e* is formed in the generally fan-shaped eaves part 52*c* to enable passing of the field coil 4 in the axial direction. The groove part 52*e* is U-shaped in cross section and open at its radially inner side. The second hook part 54 is provided by the inside edge of the groove part 52*e* located at the side of the plate part 52*a*.

In the second embodiment, similarly as in the first embodiment, the lead wire 200 of the field coil 4 can be arranged by only bending into a simple shape. Further, as the second hook part 54 is located inside the radially outer periphery of the field coil 4, the lead wire 200 can be fixed firmly and a sufficient strength against the centrifugal force can been ensured. In addition, as the insulating bobbin 5 is constructed to have the members 52*b* and 52*c* as the axial protrusion part which protrudes from the flanged part 52 in the axial direction, the centrifugal force applied to those members can be lowered. Still further, the groove part 52*e* is formed in the U-shape in section and opens at its radially innermost side in the second embodiment. Thus, the force applied in the centrifugal direction of the field coil 4 passing through the groove part 52*e* in the axial direction can be received, and breakage of the field coil 4 at that part can be prevented.

Third Embodiment

The third embodiment is differentiated from the first embodiment in that the first hook part 53, second hook part 54 and the axial protrusion part are shaped differently.

Figure 6:
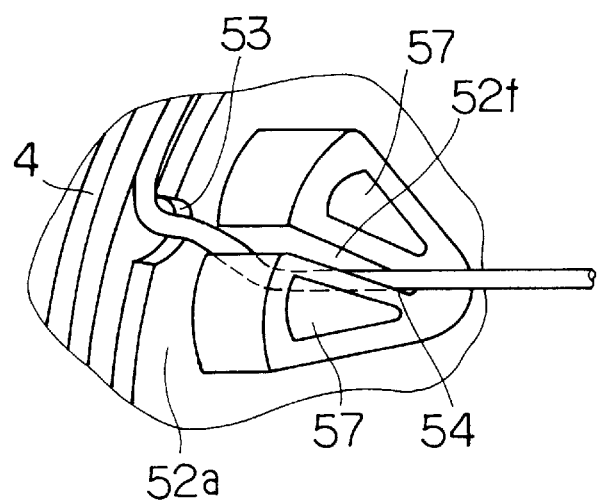
FIG. 6 is a perspective view showing a rotor for a vehicular alternating current generator according to a third embodiment of the present invention.

As shown in FIG. 6, the axial protrusion part has generally a fan shape which is along a space formed between the adjacent nail-shaped magnetic pole parts 23, and is formed to protrude from the plate part 52*a* in the axial direction. The axial protrusion part is generally fan-shaped and is formed with a groove part 52*f*, which enables insertion of the field coil 4 in the U-shape (in section) opening at the radially outer side. The groove part 52*f* has a width smaller than the outer diameter of the field coil 4 including the insulating film. The field coil 4 is held in position by its interference provided at the time of insertion. Recesses 57 are formed in the axial direction at both sides of the groove 52*f* to restrict shrinkage at the time of molding.

In the third embodiment, the first hook part 53 is provided by a cut-out the field coil 4 part formed at the radial end part of the plate part 52*a*. The second hook part 54 is provided by the groove part 52*f* formed in the U-shape in section.

In the third embodiment, similarly in the first and second embodiments, the lead wire 200 of the field coil 4 can be arranged by only bending the field coil 4 into the simple shape. In the second hook part, in particular, the lead wire 200 of the field coil 4 is only inserted into the groove part 52*f* opening in the radially outward direction. Further, as the first hook part 53 is provided by the cut-out part formed at the radial end part of the plate part 52*a*, closing of the axial air flow passage of the cooling air wind for the field coil 4 can be reduced more effectively. Still further, as the second hook part 54 is located inside of the outer peripheral diameter of the field coil 4, the field coil 4 can be maintained at a position where the centrifugal force is small, and breakage of the field coil 4 due to the centrifugal force can be prevented.

Fourth Embodiment

Figure 7:
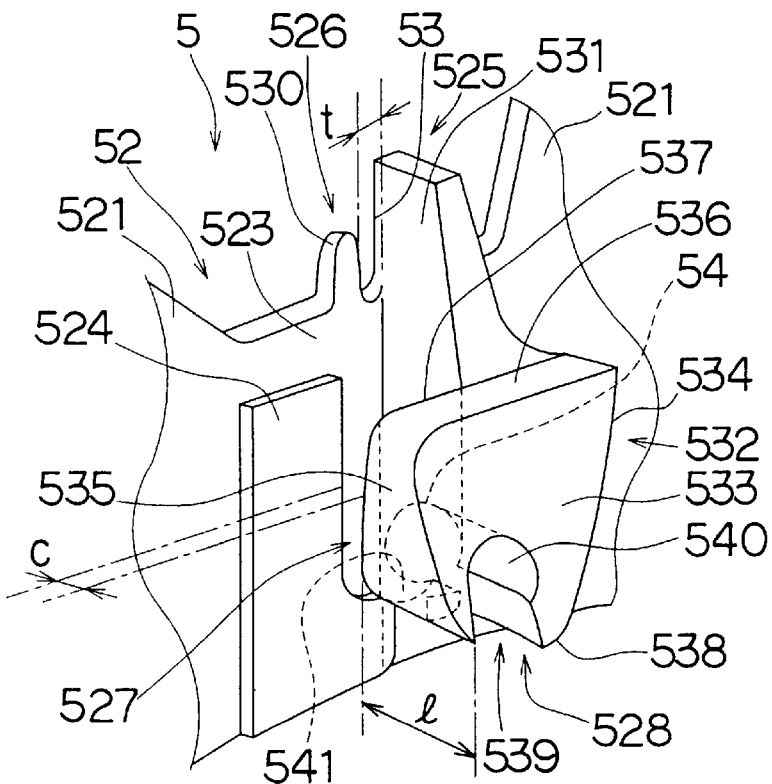
FIG. 7 is a perspective view showing a rotor for a vehicular alternating current generator according to a fourth embodiment of the present invention.

In the fourth embodiment shown in FIG. 7, a flanged part 52 of a bobbin has a plurality of petal parts located in correspondence with radial parts 22 of the claw pole 3 and a plurality of plate parts 523 located between circumferentially adjacent radial parts 22. A leader part 525 for the lead wire 200 is formed integrally with the plate part 523.

The leader part 525 has a first guide part 526 for guiding the lead wire 200 from the field coil to the outside, a second guide part 527 for guiding the lead wire 200 in the radial direction, and a third guide part 528 for guiding the lead wire 200 in the axial direction.

The first guide part 526 is formed from a tongue part 530 and a pillar part 531. The second guide part 527 is formed to be surrounded by the pillar part 531, eaves part 532 and a raised part 524 of the plate part 523. The third guide part 528 is formed from the eaves part 523.

The tongue part 530 is formed in protruded shape integrally with the radially outermost end of the plate part 523. Further, the pillar part 531 is formed integrally to extend from the axial side surface of the plate part 523 to the radially outermost edge of the plate part 523. This pillar part 531 is located more frontward with respect to the coil-winding direction of the field coil 4. A space t which is slightly smaller than the diameter of the lead wire 200 is provided between the tongue part 530 and the pillar part 531. The tongue part 530 is made of resin to be deformed when the lead wire 200 is pressed into the space t. The angled part of the pillar part 531 is provided as the first hook part 53. The tongue part 530 is effective to sandwich and fix firmly the lead wire 200.

The eaves part 532 is formed integrally at the axial end part of the pillar part 531 in a generally triangular shape. This eaves part 532 extends rearwardly from the pillar part 531 with respect to the coil-winding direction of the field coil 4. The eaves part 532 has a generally triangular outer end surface 534, rear surface 535 extending in the radial direction, upper side surface extending in the circumferential direction, inner end surface 537 opposing the plate part 523 and lower side surface 538.

The upper side surface 536 of the eaves part 532 is located radially inside of the first guide part 526. This arrangement improves rotor production efficiency at the time of assembling the lead wire 200 with the first guide part 526. A sufficiently large curved surface is formed at the angled part between the upper side surface 536 and the rear surface 535. This curved surface is effective to improve rotor production efficiency at the time of assembling the lead wire 200 with the second guide part 527. A slit 539 opens along the axial direction on the lowermost part of the lower side surface 538.

The eaves part 532 has an axial dimension 1 which is larger at the radially inner side than at the radially outer side. This axial length is effective to ensure a firm fixing of the lead wire 200. A sufficient space c is formed between the inner end surface 537 of the eaves part 532 and the plate part 523, so that the lead wire 200 is press-inserted with an insulation protecting tube 210.

A through hole 540 is formed in the eaves part 532 from the outer end surface 533 to the inner end surface 537. This through hole 540 is in communication with the slit 539. The slit 539 and the through hole 540 provide the third guide part 528 which extends in the axial direction. The wall surface of the through hole 540 provides for the third guide part 528 having a guide surface which faces the radially inner side and extends in the axial direction. The angled part at the boundary between the through hole 540 and the inner end surface 537 provides the second hook part 54. A nail-shaped protrusion 541 is formed in a protruded shape on the inner end surface side of the slit 539. This nail-shaped protrusion 541 is effective to ensure firm holding of the lead wire 200 in the through hole 540.

Figure 8:
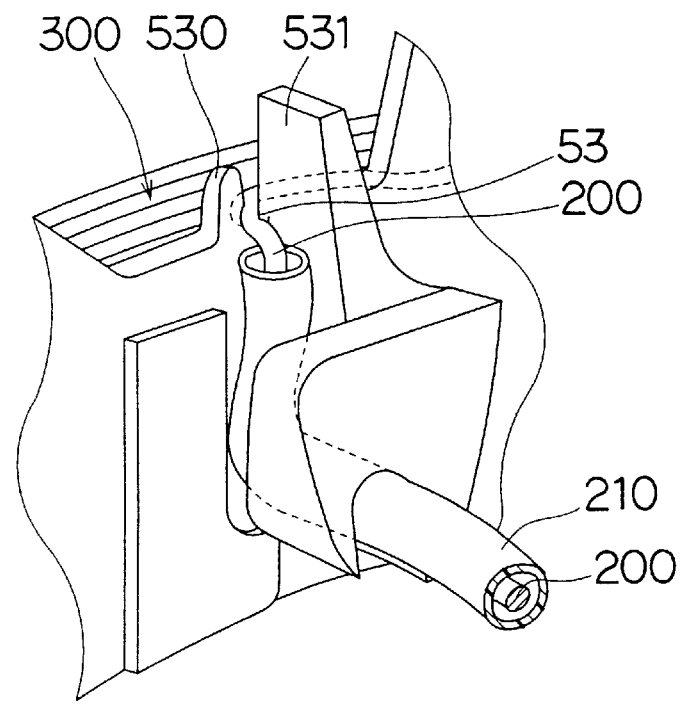
FIG. 8 is an enlarged perspective view showing a part of the rotor in the fourth embodiment.

The lead wire 200 is arranged to extend as shown in FIG. 8. The lead wire 200 extending from the outer surface 300 of the field coil is hooked with the first hook part 53, bent in the axial direction and bent at the edge of the plate part 523 in the radially inward direction. The lead wire 200 is sandwiched and fixed between the tongue part 530 and the pillar part 531.

The lead wire 200 is press-inserted inbetween the plate part 523 and the eaves part 532 from the circumferential direction together with the insulation protecting tube 210. The lead wire 200 is accommodated in the second guide part 527 together with the insulation protecting tube 210.

Further, the lead wire 200 is bent in the axial direction by the second hook part 54. The lead wire 200 is press-inserted into the through hole 540 together with the insulation protecting tube 210 through the slit 539. The lead wire 200 is press-inserted into the through hole 540 together with the insulation protecting tube 210 from the nail-shaped protrusion 541. The lead wire 200 is accommodated in the through hole 540 which functions as the third guide part 528.

The lead wire 200 and the insulation protecting tube 210 arranged as shown in FIG. 8 are bonded to the surface of a bobbin 5 by an impregnated resin.

The bobbin 5 is mounted on the field magnetic core after being arranged as shown in FIG. 8. In this embodiment, the lower side surface 538 is positioned in contact with the bottom between the radial parts of the field magnetic core. Thus, the slit 539 is closed by the field magnetic core to prevent disengagement of the lead wire 200.

In this embodiment, the lead wire 200 is arranged by only bending in a simple crank shape, so that the lead wire 200 may be arranged simply, requiring less rotor production work. Further, as the lead wire 200 is sandwiched at the first guide part 526, firm fixing is ensured. Still further, as the first guide part 526 is positioned at generally the same height as the outer surface 300 of the field coil, the length of the lead wire 200 can be shortened. Furthermore, as the eaves part 532 is located radially inside, the rotor production at the first guide part 526 can be performed from the axial direction. Still further, as the radially inner side of the eaves part 523 in the third guide part 528 is relatively long, the lead wire 200 can be guided over a long distance while reducing the centrifugal force which will exert on the eaves part 532.

The lead part 525 shown in FIGS. 7 and 8 is particularly suitable for the coil-winding end side of the lead wire 200. For the lead wire at the coil-winding start side, a slit is formed in the plate part 523 to extend up to the coil-winding body part surface or its proximity.

The lead parts for the coil-winding start side and the coil-winding end side are shaped preferably to enhance rotor production efficiency. For instance, a lead part which has a slit of the construction shown in FIG. 2 may be adopted for the coil-winding start side, and the lead part construction shown in FIGS. 7 and 8 may be adopted for the coil-winding end side.

It is to be noted that the axial protrusion formed on the flanged part 52 may be formed at locations other than the leading position of the field coil 4 in the first to fourth embodiments. In this instance, the coil-winding start position and the coil-winding end position can be determined arbitrarily to improve the production efficiency and rotor production efficiency.

What is claimed is:

1. A rotor for a vehicular alternating current generator comprising:
   a Lundell type field magnetic core press-fitted around a rotary shaft;
   an insulating bobbin fitted around the field magnetic core; and
   a field coil wound around the insulating bobbin, wherein the insulating bobbin has a cylindrical coil-winding body part around which the field coil is wound and a flanged part extending in a radially outward direction from an axial end of the coil-winding body part, the flanged part is formed with a first hook part which directs a lead wire of the field coil in a radially inward direction along an axial side end surface of the flanged part and with a second hook part which directs the field coil directed in the radially inward direction further in an axial direction.

2. A rotor for a vehicular alternating current generator as in claim 1, wherein the second hook part is located inside a radially outer periphery of the field coil.

3. A rotor for a vehicular alternating current generator as in claim 1, wherein the lead wire is fixed to the flanged part by an impregnated material.

4. A rotor for a vehicular alternating current generator as in claim 1, wherein the second hook part is formed on an axial protrusion part provided on an axial end surface of the flanged part to protrude in the axial direction.

5. A rotor for a vehicular alternating current generator as in claim 4, wherein an axial guide is formed on the axial protrusion part for guiding the lead wire directed from the second hook part in the axial direction.

6. A rotor for a vehicular alternating current generator as in claim 5, wherein the axial guide is a groove which is U-shaped in cross section and open at a radially inner side.

7. A rotor for a vehicular alternating current generator as in claim 4, wherein the axial protrusion part is generally in a fan shape along a space formed between adjacent nail-like magnetic poles of the Lundell type field magnetic core.

8. A rotor for a vehicular alternating current generator as in claim 1, wherein the field coil has lead wires at a coil-winding start side and at a coil-winding end side, and the lead wires extend in the axial direction from positions which are in an axial symmetry relative to a center of the rotary shaft.

9. A rotor for a vehicular alternating current generator as in claim 1, wherein the first hook part and the second hook part are formed on an axial protrusion part, the axial protrusion part is spaced by a space relative to the flanged part, and the lead wire extending in the radial direction between the first hook part and the second hook part is inserted in the space.

10. A rotor for a vehicular alternating current generator as in claim 1, wherein the first hook part is a pillar part extending in the radial direction and having a top end, the end being positioned radially outside of a radially outer most end of the flanged part.

11. A rotor for a vehicular alternating current generator as in claim 1, wherein a portion of the field coil directed in the radially inward direction is in continuous contact with the flanged part.

12. A rotor for a vehicular alternating current generator comprising:

a Lundell type field magnetic core press-fitted around a rotary shaft;

an insulating bobbin fitted around the field magnetic core; and a field coil wound around the insulating bobbin, wherein the insulating bobbin has a cylindrical coil-winding body part around which the field coil is wound and a flanged part extending in a radially outward direction from an end of the coil-winding body part, and a lead wire of the field coil is arranged to extend through a radially outermost end of the flanged part and to be directed in a radially inward direction along an axial side end surface of the flanged part.

13. A rotor for a vehicular alternating current generator as in claim 12, wherein a portion of the field coil directed in the radially inward direction is in continuous contact with the axial side end surface of the flanged part.

14. A rotor for a vehicular alternating current generator comprising:

a Lundell type field magnetic core press-fitted around a rotary shaft;

an insulating bobbin fitted around the field magnetic core;

a field coil wound around the insulating bobbin;

a slip ring fixed to one end side of the rotary shaft; and connecting terminals which connect electrically the field coil and the slip ring, wherein the insulating bobbin has a cylindrical coil-winding body part around which the field coil is wound, a flanged part extending in a radially outward direction from each end of the coil-winding body part, and an axial direction protrusion part extending in an axial direction from an axial end surface of the flanged part which is on a side of the slip ring, and the flanged part is formed with a first hook part which directs a lead wire of the field coil in a radially inward direction along an axial side end surface of the flanged part, and the axial protrusion part is formed with a second hook part which directs the field coil directed in the radially inward direction further in an axial direction at a radially inside of a radially outermost periphery of the field coil.

* * * * *